UNITED STATES PATENT OFFICE 2,307,629

CEMENTITIOUS ARTICLE OF MANUFACTURE

John C. MacIldowie, Nashua, N. H., assignor to Johns-Manville Corporation, New York, N. Y., a corporation of New York No Drawing. Application April 13, 1938, Serial No. 201,675

5 Claims. (Cl. 117—123)

This invention relates to an article of manufacture and the method of making the same. It relates particularly to a dry fibro-cement product containing the cement in incompletely set condition.

It is an object of the invention to provide an asbestos-cement sheet or the like that is desirable for structural uses and that is more readily worked by common carpentry tools than such sheets heretofore made. Other objects and advantages will appear from the description that follows.

Briefly stated, the invention comprises the product resulting from and the method of forming a compressed and shaped fibre-reenforced cementitious composition, incompletely setting the cement therein, and then preventing further curing of the cement. The invention comprises, also, the product resulting from and the method of incompletely impregnating a fibro-cement article with a fluid composition adapted to be lowered in viscosity by warming, and then warming to cause flowing of the impregnating material inwardly, away from the outer surface portions of the impregnated article.

The hydraulic cementitious material used in my invention is one requiring a relatively long setting time and exhibiting high strength after setting. The Portland cement is preferred and has outstanding advantages for the present purposes.

For best results, the fibres should be asbestos and, preferably, chrysotile. For some purposes, however, there may be substituted other fibres such as hemp, jute, kapok, or the like.

Inert fillers may be used to lighten, make less expensive, or make less hard the finished article. Among such fillers that may be used are sawdust, slate dust, or finely divided diatomaceous earth.

Impregnating materials that may be used, either alone or mixed with each other, should constitute waterproofing, that is, should substantially prevent access of moisture to the cementitious material in the finished product, so that there is no appreciable hardening of the impregnated article during storage at atmospheric temperature for two months or so.

Among the impregnating materials that may be used are waxes, oils, and asphaltic compositions. The material should be one that may be made relatively free-flowing for impregnation. I prefer to use as the impregnating material a drying oil, as, for example, linseed, perilla, oiticica, or China-wood oil.

The proportions of the several ingredients are those that are conventional in the industry of asbestos and cement sheets, with the exception of the proportion of the impregnating material. Thus, there may be used about 25 to 50 parts by weight of asbestos fibres, of a length commonly used in the manufacture of asbestos and cement sheets, shingles, or siding units, 35 to 50 parts of Portland cement, and 20 to 30 parts of inert filler, say, rather fine sawdust, for each 100 parts dry weight of the finished but unimpregnated sheet. When impregnation is employed, the proportion of impregnating material is substantially less than that required to give complete saturation. I prefer to use, for instance, only about one-half to three-quarters of the proportion of impregnating material ordinarily employed in making a fully impregnated sheet. In a typical product made in accordance with this invention, there is present about 4 to 8 parts by weight of the impregnating material to 100 parts of other ingredients. As a result, a substantial proportion of the void space originally present in the unimpregnated sheet is left unfilled.

Various other conventional admixtures, such as pigments or agents for accelerating the hardening of the impregnating material, may be incorporated. For example, commercial dryers may be mixed into the selected drying oil before the latter is impregnated.

The various ingredients other than the impregnating material are formed into a wet mixture with water, the water being in excess of the amount required to hydrate the cementitious material and, preferably, making the mixture plastic, so that it will flow when compressed between shaping members. This mixture or composition is then shaped and strongly compressed, as, for instance, into sheet form, with the elimination of a large part of the excess water.

The shaping of the mixture may be effected by means of the common cardboard machine, commonly called the "wet machine" in the asbestos and cement sheet industry. In the use of this machine and method, the cement and fibres, either with or without the pigmentary or inert filling material, are mixed into an aqueous suspension with water and then formed into a wet plastic sheet on the rotating, receiving drum of the machine. When the thickness of layer on the drum has been built up approximately to that desired, the sheet is removed from the drum, shaped into the form selected, usually flat, and strongly compressed between shaping members, such as steel plates. The compression is provided, suitably, in a hydraulic press, at a pressure of a thousand pounds or more to the square inch, under conditions permitting escape of water from the plastic material. In an alternative method, the aqueous mixture is introduced into the filtering bed of a hydraulic press and is there strongly compressed against a filtering member.

The shaped and compressed article is then subjected to treatment to cause the cement to become largely but incompletely set. The cement is permitted to become about one-third to three-fourths fully set, these terms meaning set to the extent resulting from permitting the compressed article to remain at atmospheric temperature for about one-third to three-fourths of the time normally allowed for substantially complete setting of the Portland cement. For instance, the setting is allowed to proceed for approximately ten to twenty-one days (as compared to twenty-eight days normally), after which time further setting is prevented.

Arresting of the cure and prevention of further setting is produced by prompt drying of the thus partially set cementitious article. The drying may be effected at a temperature above the boiling point of water, maintained for a day or so, each sheet being spaced from other sheets or other large surface during the drying operation. In a typical procedure, the sheets made as described that are to be dried are arranged with metal rods or asbestos strip separators between adjacent sheets. The assembly is then subjected to a temperature of about 300° F. for eighteen hours. This procedure produces "dry" or "substantially dry" sheets, as the terms are used herein.

The sheets so made are preferably treated to prevent resumption of the setting operation on exposure to the atmosphere. Thus, there may be impregnated a waterproofing agent of the kind described above.

For this impregnation, the spaced sheets, preferably arranged vertically and in the assembly with rod or strip separators described above, are immersed in a bath of the impregnating material in liquid form. Using the drying oils, I prefer to immerse the sheets in the oil at an elevated temperature, say, at about 200 to 300° F.

For best results, the impregnation is made incomplete. For instance, I keep the sheets immersed in the impregnating bath until the outer portions only of each sheet are impregnated.

On the other hand, the amount of impregnating material introduced should be adequate to prevent entrance of moisture into the finished sheet.

I find these conditions to be met when there is left, directly after the immersion of the sheet in the impregnating material, an unimpregnated core corresponding to about one-fourth to one-half of the total thickness of the sheet. With the impregnating material of the consistency of linseed oil at 240° F., an immersion time of about three minutes is adequate for sheets of one-half inch thickness.

The impregnated sheets are next subjected to treatment to harden the impregnated material. If asphaltic or like materials have been used, they are hardened by cooling the sheet to atmospheric temperature, after evaporation of any volatile extenders or solvents that may have been used to promote fluidity for impregnation. When drying oils have been used, they are hardened by baking the impregnated sheets in contact with air. Thus, sheets impregnated with drying oils may be baked at about 300 to 475° F. for several hours to half a day, to cause oxidation and hardening of the oil.

Finally, the sheets are cooled to atmospheric temperature.

They may then be polished, as by sanding the surface that is to constitute the face of the sheet or panel during use. They may be sawed or trimmed to desired length and breadth.

Lacquers may be used to finish the sheets, as, for instance, conventional lacquers including, as the binder or base, a polymerized resinous vinyl compound, pyroxylin, glycerine phthlate, and/or a resinous phenolaldehyde compound.

Special advantages have been found in the incomplete impregnation described above. Incompletely impregnated sheets, when later maintained at a temperature above the liquefying point of the impregnating material, as, for example, during the baking operation described or during subsequent use, undergo appreciable flowing of the impregnating material from the outer portions of the sheet towards the inner unimpregnated portion. There is thus avoided exudation of the impregnating material on the face of the sheet. Furthermore, the proportion of impregnating material is inadequate to fill all of the void spaces between the particles of fibro-cement composition. The result is avoidance of any continuous smooth film of impregnating material on the face of the sheet and, conversely, sufficient porosity at the face to permit the proper footing or adherence of a lacquer applied as a finishing material over the sheet.

As a result of the process described, there is produced a sheet that, although desirably strong for structural purposes, is much more readily sawed, cut, or drilled than comparable asbestos and cement products in which the cement is fully set. Furthermore, there is less danger of cracking such sheets during nailing with small nails or working with usual tools. Although the incompletely cured asbestos and cement sheet is relatively weak and brittle before impregnation, the impregnation and baking are accompanied by a noticeable increase in the strength of the sheet. The sheet becomes tough, while remaining more or less flexible.

The details given are for the purpose of illustration, not restriction, and variations within the spirit of the invention are intended to be included in the scope of the appended claims.

What I claim is:

1. A fibrous-cementitious article of manufacture having the characteristics of high strength, flexibility and worability with conventional cutting tools comprising a substantially dry, waterproofed, strongly compressed and shaped composition including Portland cement and reenforcing fibres distributed therethroughout, the Portland cement being incompletely hydrated and about one-third to three-fourths fully set.

2. An article of manufacture as described in claim 1, including a waterproofing agent impregnated into the said composition and preventing access of moisture to the partially set hydraulic cementitious material.

3. An article of manufacture as described in claim 1, including a drying oil impregnated into the said composition and preventing access of moisture to the partially set hydraulic cementitious material, the drying oil being in hardened condition.

4. An article of manufacture comprising a dry, waterproofed, strongly compressed composition including partially hydrated Portland cement, in largely but incompletely set and hardened condition, fibres distributed therethroughout, and an impregnated drying oil, the drying oil being in hardened condition and being present in limited proportion leaving unfilled a substantial amount of the void space within the said composition.

5. An article of manufacture as described in claim 1, including a waterproofing agent impregnated into the exterior portions only of the article and constituting approximately 4 to 8% of the entire weight of the article.

JOHN C. MacILDOWIE.